United States Patent [19]

Sievert

[11] 3,937,520

[45] Feb. 10, 1976

[54] IN SITU MINING USING BACTERIA

[75] Inventor: John A. Sievert, Ponca City, Okla.

[73] Assignee: Continental Oil Company, Ponca City, Okla.

[22] Filed: Feb. 22, 1974

[21] Appl. No.: 444,935

[52] U.S. Cl................ 299/4; 75/101 R; 166/246; 299/5; 423/27
[51] Int. Cl.² ........................................ E21C 43/00
[58] Field of Search........ 299/5; 166/246, 300, 307; 75/101 R, 104; 423/27, 41, 150

[56] References Cited
UNITED STATES PATENTS

| | | |
|---|---|---|
| 3,679,397 | 7/1972 | O'Connor et al. ............. 75/101 R |
| 3,713,698 | 1/1973 | Rhoades ............................ 299/4 |
| 3,777,004 | 12/1973 | Lankenau et al. .................... 423/27 |
| 3,834,760 | 9/1974 | Spedden et al. ..................... 299/5 |

FOREIGN PATENTS OR APPLICATIONS

| | | | |
|---|---|---|---|
| 825,473 | 10/1969 | Canada................................. 299/5 |

Primary Examiner—Frank L. Abbott
Assistant Examiner—William F. Pate, III

[57] ABSTRACT

Mineral values are recovered in situ by generating a leaching agent in the formation containing the mineral to be recovered.

6 Claims, 3 Drawing Figures

SITU MINING USING BACTERIA

The invention of this application generally relates to the recovery of mineral values from subterranean formations or strata and particularly to the recovery of mineral values which are soluble in sulfuric acid.

Numerous methods of recovering mineral values from strata are known. These mineral values are recovered from the ore by a variety of methods which shall be generally referred to herein as solubilizing. These methods generally solubilize or dissolve the desired mineral value by solvent action, by a chemical conversion to a more soluble form, by chemical reaction with an agent in a carrier fluid, or by changing the conditions in the strata or source materials so that the desired mineral value is mobilized and can be suspended in a carrier fluid.

The process of this invention can be generally applied to any strata or source material containing mineral values soluble in sulfuric acid. Known processes of solubilizing such mineral values require high volumes of solubilizing fluid and displacement fluids for even modest recovery.

The invention of this application provides a simple process which can be used to recover substantially all of the desired minerals using in situ solubilizing methods and in situ generation of the solubilizing agent. The process of this invention avoids the loss of high mineral concentration liquor in stagnant areas of the stratum.

SUMMARY OF THE INVENTION

It has been discovered that a highly efficient process for leaching mineral values from a stratum by in situ leaching can be accomplished by generating the leaching reagent or solubilizing agent in situ; that is, generating the leaching agent in the leaching fluid after the fluid has contacted or saturated the stratum to be leached. As initially injected, the leaching liquid does not have a leaching reagent concentration sufficient to leach a significant quantity of the mineral value from the stratum. The leaching reagent is generated in situ in the leaching fluid after the fluid has contacted the stratum. In previous methods, a high concentration of leaching reagent was required in the leaching fluid to leach and keep the mineral value dissolved in the fluid which swept through the stratum. This formed a region of high mineral concentration in the leading portion of the fluid which was eventually trapped in the stagnant areas of the flow pattern. Thus much of the mineral values were lost, wasting both leaching agent and mineral values.

By this invention, there is provided a simple process for recovering mineral values from a source material such as a subterranean stratum in high yield using a relatively low intial volume of sulfuric acid and low volumes of sweep or displacement fluids. This is a process for recovering mineral values from a stratum leachable by a fluid containing a leaching or solubilizing reagent comprising injecting into said stratum to contact said mineral value a leaching fluid which contains said leaching reagent at a concentration insufficient to substantially leach said mineral value, said fluid containing a means for generating the leaching reagent in situ in said stratum; generating said leaching reagent in situ in said stratum to produce a concentration of leaching reagent sufficient to leach the desired mineral value contacted in said stratum; leaching said contacted mineral value; recovering from said stratum said leaching fluid containing said leached mineral value in a manner to recover a major portion of said leached mineral value with the concentration of said leached mineral value in the recovered leaching fluid being relatively uniform throughout the fluid recovery cycle.

BRIEF DESCRIPTION OF DRAWING

FIGS. 1 and 2 illustrate the stagewise flow pattern which develops during a typical displacement process.

Figure 1:
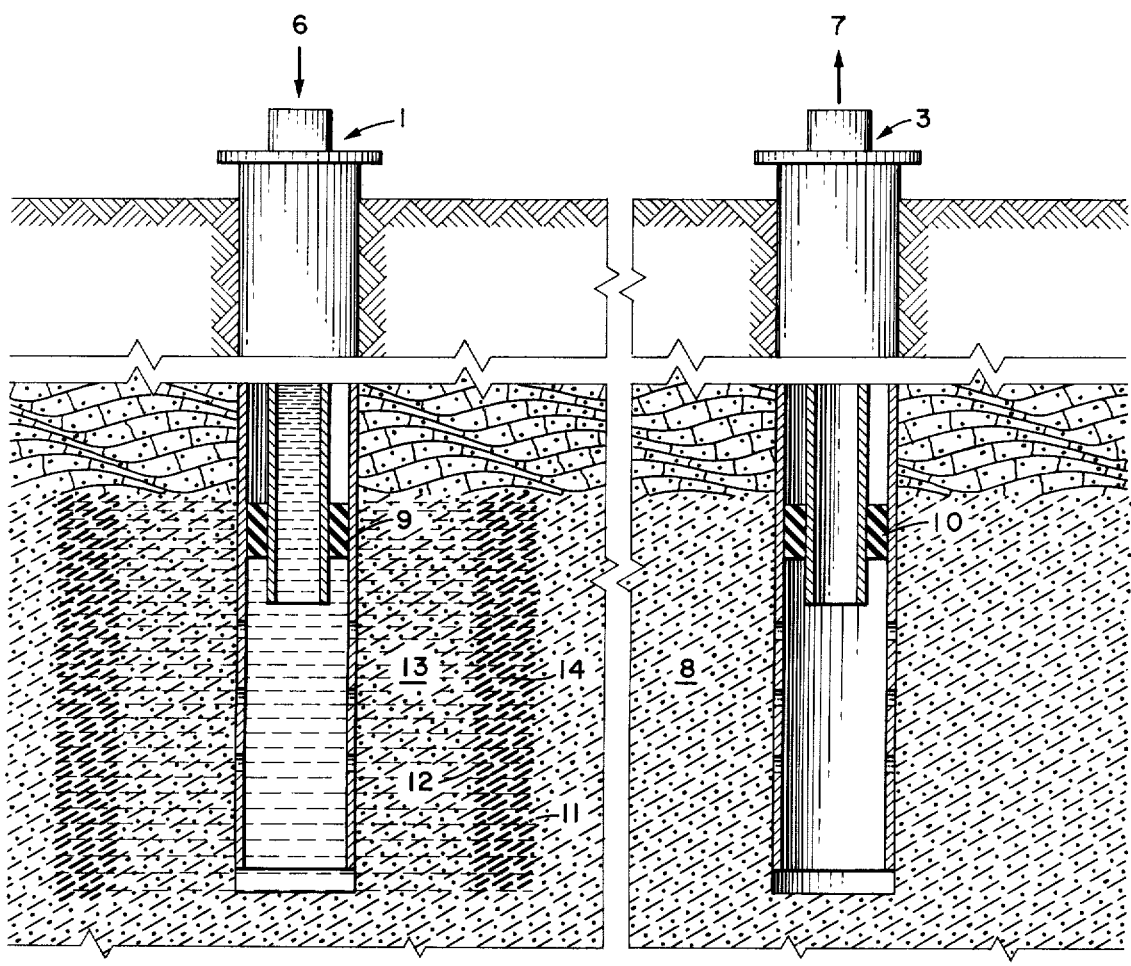
FIG. 1 is a diagrammatic, vertical section view showing an injection well 1 connecting with stratum 8 containing the desired mineral values and production well 3.

This invention involves the use of a biological agent such as bacteria to produce in situ the sulfuric acid leaching agent in sufficient strength to solubilize the desired mineral value.

The features of conventional leaching processes can be used as described in known references in view of this disclosure. Features of these known processes can also be combined or modified by one skilled in the art in view of this disclosure. Typical processes are described in the following references: "Solution Mining of Uranium" by Anderson et al. in the January 1968 Mining Congress Journal at page 20; "Uranium Dividends from Bacterial Leaching" by MacGregor in the March 1969 Mining Engineering at page 54; "Factors Influencing Application of Bacterial Leaching to a Canadian Uranium Ore" by Harrison et al. in the December 1966 Technical Bulletin TB85 of the Canadian Department of Energy, Mines, and Resources; "Mining in Situ by Nature's Easy Way" in the October 1967 Engineering Mining Journal at page 75; *Physical Principles of Oil Production* by Muskat published in 1949 by McGraw-Hill Book Company of New York; U.S. Pat. Nos. 2,818,240 to Livingston; 2,954,218 to Dew; 3,113,617 to Oakes; 3,113,618 to Oakes; 3,130,960 to Martin; 3,199,586 to Henderson; 3,266,889 to Duncan; 3,268,288 to Goren; 3,302,711 to Dilgren; 3,305,353 to Duncan; 3,309,141 to Fitch; 3,278,233 to Hurd; 3,347,661 to Mayling; 3,455,679 to Mayling; and 3,607,232 to Duncan. These references describe secondary recovery methods, leaching fluid, leaching agent, and means for generating leaching agent. Conventional methods are applicable to this invention in view of this disclosure which cover features of injecting fluid into a stratum, controlling the flow of said fluid, recovery of said fluid, and treatment of said recovered fluid. These features are discussed by some of the references listed herein. These references and others are discussed and listed in a paper, In Situ Leaching of Uranium, by Sievert et al. presented at the Fall 1970 Meeting of the Society of Mining Engineers of AIME at St. Louis. This paper describes some problems of in situ leaching which are solved by the invention of this application.

The process of this invention is applicable to any mineral value which can be leached or solubilized from source material or strata by a sulfuric acid leaching fluid, for example, carnotite. The leaching agent can operate by solvent action, by chemical combination with the desired mineral value, by chemical conversion of the mineral value to a form soluble in the leaching fluid, or by changing conditions which make the mineral value soluble. The carrier fluid can be any fluid which will sustain bacterial life while the leaching agent is being generated in situ. The carrier fluid is preferably a weakly acid aqueous solution or dispersion. The leaching agent can be used with additives which promote generation of the leaching agent in the leaching fluid, modifies the relationship between the leaching agent and leaching fluid, promotes leaching, or modifies any feature of the in situ leaching process according to conventional methods in view of this disclosure. Typical additives include surfactants, emulsifiers, and salts such as ferric chloride and ferric sulfate.

A critical feature of the process of this invention is the absence of leaching agent in a concentration sufficient to substantially leach a significant portion of the desired mineral value during the injecting step in which the leaching fluid with the means for generating the leaching agent is placed in the ore stratum. Some leaching of the mineral values can occur as the leaching fluid is injected into the stratum and swept through the ore bed, but the leaching agent concentration should be low enough so that accumulation of a significant portion of the desired mineral value in the leading boundary edge of the leaching fluid phase as it sweeps through the stratum should not be significant. The leaching agent concentration can be maintained at a low value by any method which gives a sufficient time delay between the introduction of the leaching fluid with generating means into the formation and the time required for the leaching fluid with generating means to flow through the stratum to the extent desired. For example, this time delay can be accomplished by using a chemical or biological generating means to produce the leaching agent which has a reaction rate which gives the necessary time delay between introduction of the leaching fluid into the stratum and attainment of the concentration necessary for efficient leaching. A two-step injection process can also be used whereby one reactant or a biological agent such as bacteria is introduced into the stratum and is in contact with or adsorbed into the strata. Other reactants or catalysts for the chemical reaction or nutrients for the bacterial reaction or the bacteria themselves are introduced in a second portion of the leaching fluid to initiate the generating step and produce the leaching agent in close proximity to the desired mineral value which is to be leached. A generating process is preferred which does not require injection of nutrients or reactants during the generating step or the leaching step so that the concentration of mineral value in the leaching fluid will be substantially uniform throughout the strata.

During the recovery step, the leaching fluid can be recovered from the strata by any one of numerous conventional methods such as are described in Muskat or the other references listed. One recovery method uses a single well drilled from the surface to a subterranean stratum containing the desired mineral value in which the leaching fluid and generating means are injected into the stratum which is under a natural hydrostatic pressure and recovered by displacement of the leaching fluid after the leaching operation by the natural hydrostatic pressure. Conventional flow patterns between two or more wells communicating with the subterranean stratum such as a five-spot flow pattern, a seven-spot flow pattern, as well as modifications and combinations thereof, can be used. Stratum, as used herein, includes one or more subterranean formations or layers of mineral ore as naturally deposited.

The means for generating the leaching agent, as used herein, includes all necessary nutrients and initiators to produce the leaching agent or any necessary intermediates. Consists essentially of, as used herein, includes the process steps and features set forth herein and excludes only those which would substantially change the process or any feature thereof but does not exclude modifications, combinations, or equivalents which can be substituted for any one or more of the steps or features of the process.

Several methods are available for injecting leach fluid into a formation and controlling the flow pattern. FIG. 1 of the drawings shows an injection well 1 drilled into a producing formation 8 from which mineral values are to be recovered. For purposes of illustration, casing is set in well 1 well into the mineral-bearing zone 8 and is fixed in place in accordance with conventional practice. A production well 3 spaced from the injection well 1 a distance determined by the volume, time, hydrostatic, and economic factors is drilled into the oil-bearing formation 8, and casing is set in accordance with conventional practice.

Packers 9 and 10 are set in wells 1 and 3 and tubing run through the packers. Leach fluid 13 is delivered through the tubing into formation 8. Leach fluid 14 containing the solubilized mineral flows from formation 8 into well 3, and the leach fluid is lifted to the surface.

Figure 2:
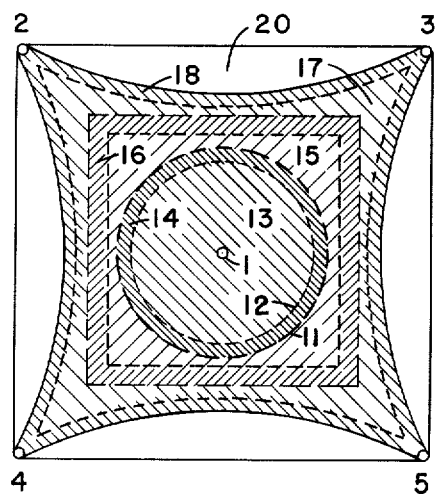
FIGS. 2 and 3 are plan views illustrating a typical five-spot well pattern showing an injection well 1 and production wells 2, 3, 4, and 5.

In FIG. 2 of the drawings, an injection well 1 is used in the formation 8. Spaced from the injection well 1 are production wells 2, 3, 4, and 5.

Mineral values are produced from the formation by pumping a leach solution into injection well 1. The solution 13 flows outwardly through the formation 8 and is produced through wells 2, 3, 4, and 5 through which the mineral-containing leach fluid is lifted to the surface. The wells illustrated in FIGS. 2 and 3 of the drawings are arranged in a five-spot flood pattern.

FIG. 2 shows a stagewise leaching or displacement of fluids in a formation forming a high concentration boundary layer 14 in the initial stage, 16 in the intermediate stage, and 18 in the final stages. Stagnant area 20 is shown in FIG. 2. The leaching fluid or sweep fluid 13 used to displace the high concentration boundary layer 14 is shown in FIGS. 1 and 2 in the initial stage with leading edge 11 and trailing edge 12. In FIG. 2, the leaching fluid is shown as 15 in the intermediate stage and as 17 in the final stage preceding fluid breakthrough of the flowing fluid into the producing wells.

Figure 3:
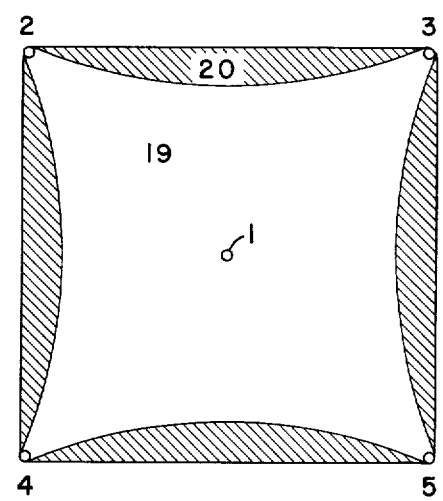

FIG. 3 shows the flow pattern and leach fluid concentration for the process of this invention. The leach fluid 19 is at relatively uniform concentration throughout the stratum between the producing wells in the final stage immediately preceding breakthrough into the producing wells 2, 3, 4, and 5. With subsequent displacement, the leach fluid 19 of FIG. 3 maintains the same flow pattern. The low flow area (corresponding to area 18 in FIG. 2) and relatively stagnant area 20 do not contain the boundary layer of high mineral concentration, which is found in conventional practice and which results in a substantial loss of leached mineral or requires large volumes of displacement fluid to sweep the flow areas 20 and 18 (18 not shown in FIG. 3).

Biological agents which can be used for a preferred process of this invention include bacteria which operate on the ferrous-ferric ion cycle. A preferred bacteria produces ferric ion which acts as an oxidizing agent and which is particularly useful for oxidizing an orecontaining uranium mineral value to make the uranium mineral values soluble. Bacteria such as Ferrobacillus ferrooxidans and Thiobacillus ferrooxidans, thioparus, concretivorus, and neopolitanus which produce sulfuric acid are preferred for the process of this invention. The leaching reagent and leaching conditions must be selected and matched to be sure the components which would retard or poison the desired reaction are avoided. For example, some components will interfere with some types of bacteria used to generate the leaching agent. Anaerobic bacteria are preferred for the biological process of this invention to avoid the necessity of supplying oxygen in the leaching fluid. A leaching agent generating process is preferred which derives a substantial part of the reactants or nutrients required from the mineral or stratum being leached.

A preferred recovery method involves the steady production of the leaching fluid rich in the desired mineral value from the strata at a uniform rate. This recovery can be accomplished by displacing the mineral-rich leaching fluid by a natural hydrostatic pressure or by injection of a displacement or sweep fluid following the leach fluid between two or more wells communicating with the strata at spaced locations. The substantially uniform concentration of leached mineral value in the leach fluid throughout the strata makes it possible to produce or recover the leached mineral in high efficiency with a relatively low volume of leaching fluid and displacement fluid in one cycle. The uniform concentration low volume recovery process of this invention avoids the substantial loss of leached minerals by stagnation in high concentration boundary layers, by wide variation in concentration, and by reducing the volume of leaching fluid or displacement fluid required to recover the leached mineral.

I claim:
1. A process for recovering a mineral value from a stratum leachable by a fluid containing a leaching agent comprising:
    a. injecting into said stratum to contact said mineral value a medium capable of generating a leaching agent in said stratum, said medium consisting essentially of a carrier fluid, a surfactant and a biological agent;
    b. generating said leaching agent by action of said biological agent in situ in said stratum to produce a leaching agent concentration sufficient to leach the mineral value in said stratum;
    c. leaching said mineral value with said leaching agent; and
    d. displacing and recovering said fluid containing leached mineral value.
2. The process of claim 1 wherein said biological agent operates on the ferrous-ferric ion cycle.
3. The process of claim 1 wherein said biological agent is selected from the group consisting of the genera Ferrobacillus and Thiobacillus.
4. The process of claim 1 wherein said mineral value is uranium.
5. The process of claim 1 wherein said stratum is a subterranean stratum having at least one injection well for introduction of said fluid and at least one recovery well for recovering said fluid containing leached mineral value, said recovery well being spaced from said injection well.
6. The process of claim 1 wherein said medium contains nutrients for said biological agent, and said biological agent is anaerobic bacteria.

* * * * *